United States Patent [19]

Müller et al.

[11] Patent Number: 5,746,812
[45] Date of Patent: May 5, 1998

[54] STABLE AQUEOUS POLYOLEFIN WAX DISPERSIONS

[75] Inventors: Michael Wolfgang Müller, Biblis; Paul Klingelhöfer, Mannheim; Stefan Weiss, Neckargemünd, all of Germany

[73] Assignee: BASF Aktiengesellschaft, Ludwigshafen, Germany

[21] Appl. No.: 605,071

[22] PCT Filed: Aug. 27, 1994

[86] PCT No.: PCT/EP94/02846

§ 371 Date: Mar. 8, 1996

§ 102(e) Date: Mar. 8, 1996

[87] PCT Pub. No.: WO95/07313

PCT Pub. Date: Mar. 16, 1995

[30] Foreign Application Priority Data

Sep. 8, 1993 [DE] Germany ............... 43 30 342.0

[51] Int. Cl.$^6$ ............... C09G 1/08; C09F 1/02; C08L 11/06; A61K 7/16
[52] U.S. Cl. ............... 106/10; 106/270; 106/271; 424/49
[58] Field of Search ............... 106/10, 270, 271

[56] References Cited

U.S. PATENT DOCUMENTS

| | | | |
|---|---|---|---|
| 2,928,752 | 3/1960 | Felletschin | 106/238 |
| 3,563,910 | 2/1971 | Fishmon | 252/312 |
| 3,906,117 | 9/1975 | Gawrilon | 426/420 |
| 3,934,003 | 1/1976 | Tuma et al. | 424/59 |
| 3,944,492 | 3/1976 | Wheeler. | |
| 4,110,234 | 8/1978 | Loveless et al. | |
| 4,164,563 | 8/1979 | Chang | 424/83 |
| 4,191,673 | 3/1980 | Wiesman. | |
| 4,371,658 | 2/1983 | Marshall et al. | |
| 5,017,222 | 5/1991 | Cifuentes et al. | 106/10 |
| 5,021,185 | 6/1991 | Mustakallio | 252/142 |
| 5,094,687 | 3/1992 | Elepano | 106/10 |
| 5,123,964 | 6/1992 | Kerner et al. | 106/287.3 X |
| 5,319,015 | 6/1994 | Gebhardt et al. | 524/503 |
| 5,340,486 | 8/1994 | Willoughby | 252/43 |
| 5,376,170 | 12/1994 | Baker | 106/271 |
| 5,397,384 | 3/1995 | Wisnienski | 106/8 |
| 5,523,025 | 6/1996 | Erilli | 252/556 |
| 5,531,995 | 7/1996 | Lubetzky et al. | 424/409 |

OTHER PUBLICATIONS

CRC Handbook of Chemistry and Physics "Buffer Solutions" 63th edition, 1982–1983, pp. D154–D156.
CRC Handbook of Chemistry and Physics "Buffer Solutions" 65th edition, 1984–1985, pp. D148–150.
Database WPI, Section Ch, Week 9102, Derwent Publications Ltd., London, Great Britain, DD, A 281 310, 914, Aug. 8, 1990 micronized oxidized polyethylene wax acid no & dispersant.
Database WPI Section Ch, Week 8947, Derwent Publications Ltd., London, Great Britain, JP, A 1 258 914, Oct. 16, 1989 micronized polyethylene wax.

*Primary Examiner*—Shep K. Rose
*Attorney, Agent, or Firm*—Oblon, Spivak, McClelland, Maier & Neustadt, P.C.

[57] ABSTRACT

Stable aqueous polyolefin wax dispersions contain
A) from 5 to 65% by weight of polyethylene wax or polypropylene wax having a mean particle size of from 1 to 50 μm and an acid number of less than 5 mg of KOH/g of wax and
B) from 0.5 to 20% by weight of glyceride of predominantly ethylenically monounsaturated or polyunsaturated $C_{16}$–$C_{22}$-monocarboxylic acids which may additionally contain hydroxyl groups, which glyceride has been reacted with from 1 to 50 mol of a 1,2-alkylene oxide of 2 to 4 carbon atoms, as a dispersant. These dispersions are suitable for the production of floor and stone polishes, shoe polishes, car polishes, printing inks, print pastes, finishes, packagings, lubricating greases, vaseline, drawing compounds, sealing and insulating materials for electrical parts, aqueous wood glazes, hot-melt coatings, cosmetic formulations and toothpastes, in plastics processing, in papermaking and in corrosion protection, for the treatment of fabrics and yarns and for leather treatment and as parting compounds in gravity die casting, pressure die casting and centrifugal casting of nonferrous metals.

15 Claims, No Drawings

STABLE AQUEOUS POLYOLEFIN WAX DISPERSIONS

BACKGROUND OF THE INVENTION

1. Field of the Invention

The present invention relates to novel aqueous polyolefin wax dispersions which contain A) from 5 to 65% by weight of polyethylene wax or polypropylene wax having a mean particle size of from 1 to 50 μm and an acid number of less than 5 mg of KOH/g of wax and B) from 0.5 to 20% by weight of a glyceride of predominantly ethylenically monounsaturated or polyunsaturated $C_{16}$–$C_{22}$-monocarboxylic acids which may additionally contain hydroxyl groups, which glyceride has been reacted with from 1 to 50 mol of a 1,2-alkylene oxide of 2 to 4 carbon atoms, as a dispersant.

2. Description of the Related Art

Aqueous wax dispersions based on polyethylene or polypropylene can be prepared in principle by two methods: as primary dispersions by polymerization of ethylene or propylene in a surfactant-containing aqueous phase under superatmospheric pressure and in the presence of an initiator system or as secondary dispersions by dispersing dispersible polyethylene or polypropylene waxes in powder form with the aid of a suitable dispersant system. Emulsifiable waxes are usually understood here as meaning low molecular weight polyolefin chains functionalized with carboxylate, keto or hydroxyl groups; said chains can be prepared either by copolymerization of ethylene or propylene with, for example, unsaturated carboxylic acids, such as acrylic acid, or by atmospheric oxidation of polyolefin waxes.

Primary dispersions generally have particle sizes of from 0.01 to 0.25 μm, whereas it has been possible to date to prepare stable secondary dispersions having a mean particle size of only up to almost 1 μm. Dispersions having larger particles tend to undergo phase separation owing to the low density and the hydrophobic nature of the polyolefin wax.

In both preparation methods, only solids contents of up to about 35% by weight can usually be achieved. Higher wax contents are achievable in relatively high amounts only with difficulties and in the presence of suitable assistants.

U.S. Pat. No. 4,371,658 discloses spinning assistants for the production of polyamide yarns, which comprise a mixture of various emulsifiers, oxidized polyethylene having an acid number of from about 14 to 32 and alkali metal hydroxide in aqueous emulsion. Castor oil reacted with from 2 to 16 mol of ethylene oxide is mentioned as an emulsifier component.

SUMMARY OF THE INVENTION

It is an object of the present invention to provide stable aqueous polyolefin wax dispersions which, owing to the performance characteristics required, have a mean particle size of substantially more than 1 μm and a virtually unlimited shelf life. Furthermore, it should be possible to prepare these dispersions in a very simple manner and with very few assistants. The dispersions should be based on unfunctionalized polyolefin wax, ie. without stabilizing carboxylate groups.

DESCRIPTION OF THE PREFERRED EMBODIMENTS

We have found that this object is achieved by the aqueous polyolefin wax dispersions defined at the outset. As a result of the choice of the dispersant system B, it is now possible to obtain stable polyolefin wax dispersions having the desired properties by simply stirring the appropriate fine (micronized) wax powder together with the dispersant at room temperature into water. Solids contents of up to 65% by weight can be realized.

The mean particle size of the polyolefin waxes A in the novel dispersions is from 1 to 50 μm, in particular from 3 to 20 μm, especially from 5 to 15 μm. The mean particle size can best be determined by the Coulter method.

Commercial unfunctionalized polyethylene waxes having weight average molecular weights from 500 to 10,000, in particular from 1000 to 5000, g/mol or polypropylene waxes having weight average molecular weights of from 5000 to 50,000, in particular from 15,000 to 30,000, g/mol or mixtures thereof are used. The content of polyethylene or polypropylene in these waxes is more than 99% by weight. These waxes are finely comminuted by conventional methods so that they have the required particle size. They have acid numbers of less than 5, preferably less than 3, in particular less than 2, especially less than 1, mg of KOH/g of wax, indicating acidic components essentially to be regarded only as impurities in the waxes.

The novel dispersions are readily pourable and stirrable even at high solids contents and, as a rule, have Brookfield viscosities of from 200 to 5000, in particular from 500 to 1600, mm$^2$/s.

The novel dispersions contain, as main components, from 5 to 65, preferably from 10 to 60, in particular from 20 to 55, especially from 40 to 50, % by weight of wax A and from 0.5 to 20, preferably from 1 to 15, in particular from 3 to 12, especially from 4 to 10, % by weight of dispersant B. If desired, conventional assistants, such as antifoams, for example organophosphates, solubilizers, for example N-methylpyrrolidone, flow improvers, in particular at solids contents above 50% by weight, biocides, fragrances, colorants, anticorrosion agents or the like, may also be added.

The fatty acids in the alkoxylated glyceride B are predominantly, ie. to an extent of more than 50, preferably more than 70, in particular more than 80, % by weight, ethylenically mono- or polyunsaturated, preferably ethylenically mono- to triunsaturated, $C_{16}$–$C_{22}$-monocarboxylic acids, preferably $C_{18}$-monocarboxylic acids, which may additionally contain hydroxyl groups. Examples of such fatty acids are oleic acid, elaidic acid, linoleic acid, linolenic acid, erucic acid and 12-hydroxy-9-cis-octadecenoic acid (12-hydroxyoleic acid, ricinoleic acid). Saturated fatty acids, such as myristic acid, palmitic acid, stearic acid or cerotic acid, may be incorporated in minor amounts in the alkoxylated glyceride B. The glyceride is present mostly or predominantly as a triglyceride, but mono- and/or diglyceride structures having unesterified hydroxyl groups may also occur, and are even necessary, when the fatty acid radicals contain no hydroxyl groups for reaction with the alkylene oxide.

A particularly suitable 1,2-alkylene oxide is ethylene oxide, but propylene oxide and butylene oxide are also useful. Mixtures of the stated alkylene oxide may also be used for the reaction with the glyceride. The degree of alkoxylation is from 1 to 50, preferably from 2 to 30, in particular from 3 to 20, especially from 5 to 15, mol of alkylene oxide per mol of glyceride.

In a preferred embodiment, a glyceride of predominantly ethylenically mono- to triunsaturated $C_{18}$-monocarboxylic acids, at least some of which additionally contain hydroxyl groups, are used as component B, said glyceride having been reacted with from 3 to 20 mol of ethylene oxide. At least some means that part of the total amount of monocarboxylic acids, ie. usually from 50 to 100, preferably from 70 to 100, in particular from 80 to 100, % by weight of the monocarboxylic acids, contain one or more hydroxyl groups.

A particularly preferred ethoxylated glyceride B is one which contains mainly 12-hydroxy-9-cis-octadecenoic acid (ricinoleic acid), ie. in an amount of more than 50, preferably more than 70, in particular more than 80, % by weight, as $C_{18}$-monocarboxylic acid.

Very particularly outstanding results are obtained with the corresponding ethoxylation product of naturally occurring castor oil as component B. Castor oil usually contains from 80 to 85% by weight of ricinoleic acid glyceride, about 7% by weight of oleic acid glyceride, about 3% by weight of linoleic acid glyceride, about 2% by weight of palmitic acid glyceride and about 1% by weight of stearic acid glyceride.

Castor oil reacted with from 5 to 15 mol of ethylene oxide is commercially available, for example under the name Emulan® ELP (product of BASF Aktiengesellschaft). Emulan ELP is used mainly as an emulsifier for vegetable oils, such as peanut oil, coconut oil, linseed oil, corn oil, olive oil, palm oil, palm kernel oil, rapeseed oil, castor oil, soybean oil or sunflower oil.

The present invention also relates to the use of glycerides of predominantly ethylenically mono- or polyunsaturated $C_{16}$–$C_{22}$-monocarboxylic acids which may additionally contain hydroxyl groups, which glycerides have been reacted with from 1 to 50 mol of a 1,2-alkylene oxide of 2 to 4 carbon atoms, as dispersants for aqueous polyolefin wax dispersions which contain polyethylene wax or polypropylene wax having a mean particle size of from 1 to 50 μm and an acid number of less than 5 mg of KOH/g of wax.

The novel stable aqueous polyolefin wax dispersions are used in particular for the production of floor and stone polishes, shoe polishes, car polishes, printing inks, print pastes, finishes, in particular water-based finishes, packaging, for example for food, lubricating greases, vaseline, drawing compounds, sealing and insulating materials for electrical parts, aqueous wood glazes, hot-melt coatings, cosmetic formulations and toothpastes, in plastics processing, in papermaking and in corrosion protection, for the treatment of fabrics and yarns and for leather treatment and as parting compounds in gravity die casting, pressure die casting and centrifugal casting of nonferrous metals.

The novel wax dispersions are generally used here for improving the frictional properties or the abrasion resistance and, owing to their special particle size, are therefore very suitable.

The novel dispersions are toxicologically completely safe and can therefore readily be used for applications in the food sector and in cosmetics. They are also completely safe from the ecological point of view since the emulsifier involved is based on natural substances or substances related to natural substances.

The novel wax dispersions have virtually unlimited stability, ie. exhibit no settling and no deposits on vessel walls and bottoms even after storage for several months or several years. The large mean particle size results in the desired performance characteristics. The novel dispersions can be prepared simply and without problems, and, not least, the high solids concentration results in very economical storage and transport of the finished product.

EXAMPLE 6.5 g of castor oil reacted with from 5 to 15 mol of ethylene oxide (Emulan ELP from BASF Aktiengesellschaft) in 43.5 g of demineralized water were initially taken, and 50 g of micronized polyethylene wax having a weight average molecular weight of 3000 and an acid number (according to DIN 53 402) of <0.1 mg of KOH/g (Luwax® AF 30 from BASF Aktiengesellschaft) were intensively stirred in at 20° C. The wax used had a particle size of about 8 μm (determined by means of a Coulter counter).

The wax dispersion obtained had a Brookfield viscosity of 600 mm²/s and was stable for an unlimited period (no phase separation).

We claim:

1. A stable aqueous polyolefin wax dispersion comprising
   A) from 5 to 65% by weight of polyethylene wax or polypropylene wax having a mean particle size of from 1 to 50 μm and an acid number of less than 5 mg of KOH/g of wax and
   B) from 0.5 to 20% by weight of a glyceride of predominantly ethylenically monounsaturated or polyunsaturated $C_{16}$–$C_{22}$-monocarboxylic acids or said $C_{16}$–$C_{22}$-monocarboxylic acids containing hydroxyl groups, said glyceride having been reacted with 1 to 50 mol of a 1,2-alkylene oxide of 2 to 4 carbon atoms, as a dispersant.

2. A stable aqueous polyolefin wax dispersion as claimed in claim 1, comprising, as component A, polyethylene wax or polypropylene wax having a mean particle size of from 3 to 20 μm and an acid number of less than 2 mg of KOH/g of wax.

3. A stable aqueous polyolefin wax dispersion as claimed in claim 1, comprising
   A) from 20 to 55% by weight of component A and
   B) from 3 to 12% by weight of component B.

4. A stable aqueous polyolefin wax dispersion as claimed in claim 1, comprising, as component B, a glyceride of predominantly ethylenically mono- to triunsaturated $C_{18}$-monocarboxylic acids, at least some of which additionally contain hydroxyl groups, said glyceride having been reacted with 3 to 20 mol of ethylene oxide.

5. A stable aqueous polyolefin wax dispersion as claimed in claim 4, wherein the ethoxylated glyceride B comprises 12-hydroxy-9-cis-octadecenoic acid (rinoleic acid) as $C_{18}$-monocarboxylic acid.

6. A stable aqueous polyolefin wax dispersion as claimed in claim 5, wherein component B is the ethoxylation product of naturally occurring castor oil.

7. A stable aqueous polyolefin wax dispersion consisting essentially of a polyolefin wax and a glyceride dispersant for said wax, said dispersion containing
   (A) from 5 to 65% by weight of polyethylene wax or polypropylene wax having a mean particle size of from 1 to 50 μm and an acid number of less than 5 mg of KOH/g of wax, and as a dispersant,
   (B) from 0.5 to 20% by weight of a glyceride of predominantly ethylenically monounsaturated or polyunsaturated $C_{16}$–$C_{22}$-monocarboxylic acids, at least some of which additionally contain hydroxyl groups when the glyceride is present as a triglyceride, which glyceride has been reacted with from 1 to 50 mol of a 1,2-alkylene oxide of two to four carbon atoms.

8. A stable aqueous polyolefin wax dispersion as claimed in claim 7, containing
   (a) from 20 to 55% by weight of component A, and
   (b) from 3 to 12% by weight of component B.

9. A stable aqueous polyolefin wax dispersion as claimed in claim 7, wherein the ethoxylated glyceride component B is comprised mainly of 12-hydroxy-9-cis-octadecenoic acid as $C_{18}$-monocarboxylic acid.

10. A stable aqueous polyolefin wax dispersion as claimed in claim 1, comprising
   (a) from 10 to 60% by weight of component A, and
   (b) from 1 to 15% by weight of component B.

11. A stable aqueous polyolefin wax dispersion as claimed in claim 1, comprising
   (a) from 40 to 50% by weight of component A, and
   (b) from 4 to 10% by weight of component B.

12. A stable aqueous polyolefin wax dispersion as claimed in claim 7, comprising
   (a) from 10 to 60% by weight of component A, and
   (b) from 1 to 15% by weight of component B.

13. A stable aqueous polyolefin wax dispersion as claimed in claim 7, comprising
   (a) from 40 to 50% by weight of component A and
   (b) from 4 to 10% by weight of dispersant B.

14. A method of making a stable aqueous polyolefin wax dispersion as set forth in claim 1, comprising mixing glyceride component B with water, adding said polyolefin wax component A, as a solid, fine wax powder, to said mixture of glyceride and water, and intensively stirring said polyolefin wax into said mixture.

15. A method as set forth in claim 14, wherein said polyolefin is polyethylene.

* * * * *